United States Patent
Ma et al.

(10) Patent No.: US 9,913,010 B2
(45) Date of Patent: Mar. 6, 2018

(54) DATA PROCESSING METHOD AND APPARATUS

(71) Applicant: Huawei Technologies Co., Ltd., Shenzhen (CN)

(72) Inventors: Huixiao Ma, Shenzhen (CN); Xiaoling Yang, Shenzhen (CN); Yan Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/257,572

(22) Filed: Sep. 6, 2016

(65) Prior Publication Data
US 2016/0373842 A1 Dec. 22, 2016

Related U.S. Application Data

(63) Continuation of application No. PCT/CN2014/073009, filed on Mar. 6, 2014.

(51) Int. Cl.
*H04J 14/00* (2006.01)
*H04Q 11/00* (2006.01)
*H04L 12/701* (2013.01)

(52) U.S. Cl.
CPC ..... *H04Q 11/0066* (2013.01); *H04Q 11/0005* (2013.01); *H04L 45/00* (2013.01);
(Continued)

(58) Field of Classification Search
CPC ........... H04Q 11/0005; H04Q 11/0066; H04Q 2011/0039; H04Q 2011/0064; H04Q 2011/0077; H04L 45/00
(Continued)

(56) References Cited

U.S. PATENT DOCUMENTS 6,788,896 B1 9/2004 Wang et al.
2004/0151421 A1* 8/2004 Yasue ................ H04Q 11/0005
385/16
(Continued)

FOREIGN PATENT DOCUMENTS

CN 1525679 A 9/2004
CN 1581736 A 2/2005
(Continued)

*Primary Examiner* — M. R. Sedighian
(74) *Attorney, Agent, or Firm* — Leydig, Voit & Mayer, Ltd.

(57) ABSTRACT

A data processing method and apparatus are provided, which relate to the communications field and can reduce a delay and energy consumption for data processing in a data exchange process of an optical network. A specific solution is: obtaining a to-be-processed optical data packet; obtaining an optical label from the to-be-processed optical data packet; determining, according to the optical label, whether an optical signal data frame is a data frame of a preset type; if the optical signal data frame is the data frame of the preset type, obtaining a port corresponding to a label destination address according to an optical label destination address and generating an optical switching instruction; and outputting the to-be-processed optical data packet through a target port according to the optical switching instruction. The data processing method and apparatus are used for data processing.

12 Claims, 3 Drawing Sheets

(52) U.S. Cl.
CPC ............. *H04Q 2011/0039* (2013.01); *H04Q 2011/0064* (2013.01); *H04Q 2011/0077* (2013.01)

(58) Field of Classification Search
USPC .......................................................... 398/45
See application file for complete search history.

(56) References Cited

U.S. PATENT DOCUMENTS

| | | |
|---|---|---|
| 2004/0170165 A1 | 9/2004 | Maciocco et al. |
| 2005/0030951 A1 | 2/2005 | Maciocco et al. |
| 2007/0201870 A1* | 8/2007 | Cohen ............... H04Q 11/0005 398/51 |
| 2011/0217038 A1 | 9/2011 | Zhang et al. |
| 2013/0148964 A1 | 6/2013 | Le Rouzic et al. |
| 2013/0243365 A1 | 9/2013 | Sekiguchi |
| 2016/0080842 A1 | 3/2016 | Ma et al. |

FOREIGN PATENT DOCUMENTS

| | | |
|---|---|---|
| CN | 101742363 A | 6/2010 |
| CN | 103326781 A | 9/2013 |
| CN | 104185094 A | 12/2014 |
| EP | 1424870 A2 | 6/2004 |

* cited by examiner

DATA PROCESSING METHOD AND APPARATUS

CROSS-REFERENCE TO RELATED APPLICATIONS

This application is a continuation of International Application No. PCT/CN2014/073009, filed on Mar. 6, 2014, which is hereby incorporated by reference in its entirety.

TECHNICAL FIELD

The present embodiments relate to the communications field, and in particular, to a data processing method and apparatus.

BACKGROUND

As communications technologies continually develop, people are imposing more demands on network services. To meet various demands of users, a higher rate and a lower delay are required for network transmission, which requires a more efficient interconnection solution available in a data interchange network.

A switch is a network device used for data forwarding. The switch may provide an exclusive data path for any two network nodes that are connected to the switch. In an optical network, an electrical switch is used in the prior art to implement data exchange. During electrical switching, optical-to-electrical conversion needs to be performed on a received optical signal to convert the optical signal into an electrical signal, and the electrical signal is exchanged to a destination port; and then the electrical signal is converted into the optical signal by means of electrical-to-optical conversion, and the optical signal is sent. In this way, a switching process is completed. This, however, increases a delay and energy consumption for data processing in a data exchange process of the optical network.

SUMMARY

Embodiments of the present invention provide a data processing method and apparatus, which can reduce a delay and energy consumption for data processing in a data exchange process of an optical network.

To achieve the foregoing objective, the following technical solutions are used in the embodiments of the present invention:

According to a first aspect, a data processing apparatus is provided, including:

an obtaining unit, configured to obtain a to-be-processed optical data packet, where the to-be-processed optical data packet includes an optical label and an optical signal data frame;

a control unit, configured to: obtain the optical label from the to-be-processed optical data packet obtained by the obtaining unit, and determine, according to the optical label, whether the optical signal data frame is a data frame of a preset type, where if the optical signal data frame is the data frame of the preset type, the optical label includes a label destination address; and the control unit is further configured to: obtain a port corresponding to the label destination address according to the label destination address, and use the port corresponding to the label destination address as a target port and generate an optical switching instruction, where the optical switching instruction includes the target port; and an optical switching unit, configured to output the to-be-processed optical data packet through the target port according to the optical switching instruction generated by the control unit.

With reference to the first aspect, in a first possible implementation manner, if the optical signal data frame is not the data frame of the preset type, the control unit is further configured to generate an electrical switching instruction;

the data processing apparatus further includes an electrical switching unit; where the electrical switching unit is configured to: convert, according to the electrical switching instruction, the optical signal data frame into a corresponding electrical signal data frame by means of optical-to-electrical conversion; obtain a switching address from the electrical signal data frame; and output, according to the switching address, the electrical signal data frame through a port corresponding to the switching address.

With reference to the first possible implementation manner of the first aspect, in a second possible implementation manner, the electrical switching unit is further configured to: parse the electrical signal data frame to obtain a Media Access Control MAC frame; and output, according to the MAC frame, the electrical signal data frame through a port corresponding to the MAC frame.

With reference to the first aspect, in a third possible implementation manner, the control unit is further configured to search whether the optical label includes a protocol frame identifier, where if the optical label includes the protocol stack identifier, the optical signal data frame is a protocol frame and the optical signal data frame is not the data frame of the preset type.

With reference to the first aspect or any one of the possible implementation manners of the first aspect, in a fourth possible implementation manner, the control unit is further configured to determine, from stored port occupancy information, whether the port corresponding to the label destination address is available, where if the port corresponding to the label destination address is unavailable, the optical signal data frame is not the data frame of the preset type; and the port occupancy information includes an occupancy status of each port.

According to a second aspect, a data processing apparatus is provided, including: a processor, a memory, and a bus, where the processor and the memory are connected to each other by using the bus;

the processor is configured to obtain a to-be-processed optical data packet, where the to-be-processed optical data packet includes an optical label and an optical signal data frame;

the processor is further configured to obtain the optical label from the to-be-processed optical data packet, and determine, according to the optical label, whether the optical signal data frame is a data frame of a preset type;

if the optical signal data frame is the data frame of the preset type, the optical label includes a label destination address; the processor is further configured to: obtain a port corresponding to the label destination address according to the label destination address, and use the port corresponding to the label destination address as a target port and generate an optical switching instruction, where the optical switching instruction includes the target port; and the processor is further configured to output the to-be-processed optical data packet through the target port according to the optical switching instruction.

With reference to the second aspect, in a first possible implementation manner, if the optical signal data frame is not the data frame of the preset type, the processor is further configured to: generate an electrical switching instruction; convert, according to the electrical switching instruction, the optical signal data frame into a corresponding electrical signal data frame by means of optical-to-electrical conversion; obtain a switching address from the electrical signal data frame; and output, according to the switching address, the electrical signal data frame through a port corresponding to the switching address.

With reference to the first possible implementation manner of the second aspect, in a second possible implementation manner, the processor is further configured to: parse the electrical signal data frame to obtain a Media Access Control MAC frame; and output, according to the MAC frame, the electrical signal data frame through a port corresponding to the MAC frame.

With reference to the second aspect, in a third possible implementation manner, the processor is further configured to search whether the optical label includes a protocol frame identifier, where if the optical label includes the protocol stack identifier, the optical signal data frame is a protocol frame and the optical signal data frame is not the data frame of the preset type.

With reference to the second aspect or any one of the possible implementation manners of the second aspect, in a fourth possible implementation manner, the processor is further configured to determine, from stored port occupancy information, whether the port corresponding to the label destination address is available, where if the port corresponding to the label destination address is unavailable, the optical signal data frame is not the data frame of the preset type; and the port occupancy information includes an occupancy status of each port.

According to a third aspect, a data processing method is provided, including:

obtaining a to-be-processed optical data packet, where the to-be-processed optical data packet includes an optical label and an optical signal data frame;

obtaining the optical label from the to-be-processed optical data packet, and determining, according to the optical label, whether the optical signal data frame is a data frame of a preset type, where if the optical signal data frame is the data frame of the preset type, the optical label includes a label destination address;

obtaining a port corresponding to the label destination address according to the label destination address, and using the port corresponding to the label destination address as a target port and generating an optical switching instruction, where the optical switching instruction includes the target port; and outputting the to-be-processed optical data packet through the target port according to the optical switching instruction.

With reference to the third aspect, in a first possible implementation manner, the method further includes:

if the optical signal data frame is not the data frame of the preset type, generating an electrical switching instruction;

converting, according to the electrical switching instruction, the optical signal data frame into a corresponding electrical signal data frame by means of optical-to-electrical conversion; and obtaining a switching address from the electrical signal data frame, and outputting, according to the switching address, the electrical signal data frame through a port corresponding to the switching address.

With reference to the first possible implementation manner of the third aspect, in a second possible implementation manner, the obtaining a switching address from the electrical signal data frame, and outputting, according to the switching address, the electrical signal data frame through a port corresponding to the switching address includes:

parsing the electrical signal data frame to obtain a Media Access Control MAC frame; and outputting, according to the MAC frame, the electrical signal data frame through a port corresponding to the MAC frame.

With reference to the third aspect, in a third possible implementation manner, the determining, according to the optical label, whether the optical signal data frame is a data frame of a preset type includes:

searching whether the optical label includes a protocol frame identifier, where if the optical label includes the protocol stack identifier, the optical signal data frame is a protocol frame and the optical signal data frame is not the data frame of the preset type.

With reference to the third aspect or any one of the possible implementation manners of the third aspect, in a fourth possible implementation manner, the determining, according to the optical label, whether the optical signal data frame is a data frame of a preset type includes:

determining, from stored port occupancy information, whether the port corresponding to the label destination address is available, where if the port corresponding to the label destination address is unavailable, the optical signal data frame is not the data frame of the preset type; and the port occupancy information includes an occupancy status of each port.

According to the data processing method and apparatus provided in the embodiments of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
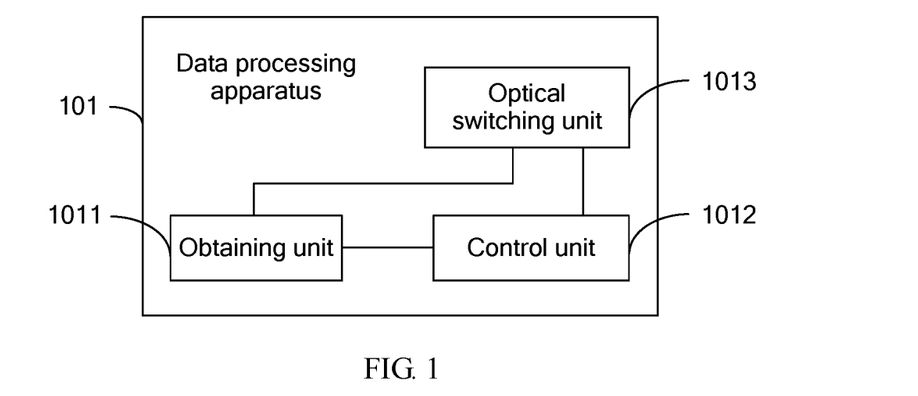
FIG. 1 is a schematic structural diagram of a data processing apparatus according to an embodiment of the present invention.

An embodiment of the present invention provides a data processing apparatus. Referring to FIG. 1, the data processing apparatus includes an obtaining unit 1011, a control unit 1012, and an optical switching unit 1013.

The obtaining unit 1011 is configured to obtain a to-be-processed optical data packet, where the to-be-processed optical data packet includes an optical label and an optical signal data frame.

The control unit 1012 is configured to obtain the optical label from the to-be-processed optical data packet obtained by the obtaining unit 1011, and determine, according to the optical label, whether the optical signal data frame is a data frame of a preset type.

If the optical signal data frame is the data frame of the preset type, the optical label includes a label destination address, and the control unit 1012 is further configured to obtain a port corresponding to the label destination address according to the label destination address, and use the port corresponding to the label destination address as a target port and generate an optical switching instruction, where the optical switching instruction includes the target port.

The optical switching unit 1013 is configured to output the to-be-processed optical data packet through the target port according to the optical switching instruction generated by the control unit 1012.

According to the data processing apparatus provided in this embodiment of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

Figure 2:
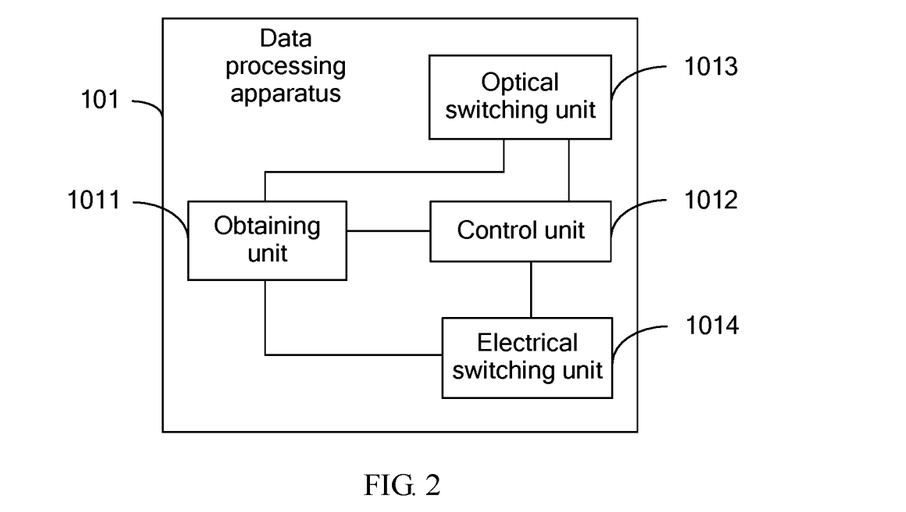
FIG. 2 is a schematic structural diagram of another data processing apparatus according to an embodiment of the present invention.

Optionally, in an implementable application scenario, referring to FIG. 2, the data processing apparatus 101 further includes an electrical switching unit 1014.

If the optical signal data frame is not the data frame of the preset type, the control unit 1012 is further configured to generate an electrical switching instruction.

The electrical switching unit 1014 is configured to convert, according to the electrical switching instruction, an optical signal data frame into a corresponding electrical signal data frame by means of optical-to-electrical conversion; obtain a switching address from the electrical signal data frame; and output, according to the switching address, the electrical signal data frame through a port corresponding to the switching address.

Further optionally, the electrical switching unit 1014 is further configured to: parse the electrical signal data frame to obtain a Media Access Control (MAC, Media Access Control) frame and output, according to the MAC frame, the electrical signal data frame through a port corresponding to the MAC frame.

Optionally, in another implementable application scenario, the control unit 1012 is further configured to search whether the optical label includes a protocol frame identifier, where if the optical label includes the protocol stack identifier, the optical signal data frame is a protocol frame and the optical signal data frame is not the data frame of the preset type.

Optionally, the control unit 1012 is further configured to determine, from stored port occupancy information, whether the port corresponding to the label destination address is available, where if the port corresponding to the label destination address is unavailable, the optical signal data frame is not the data frame of the preset type; and the port occupancy information includes an occupancy status of each port.

According to the data processing apparatus provided in this embodiment of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

Figure 3:
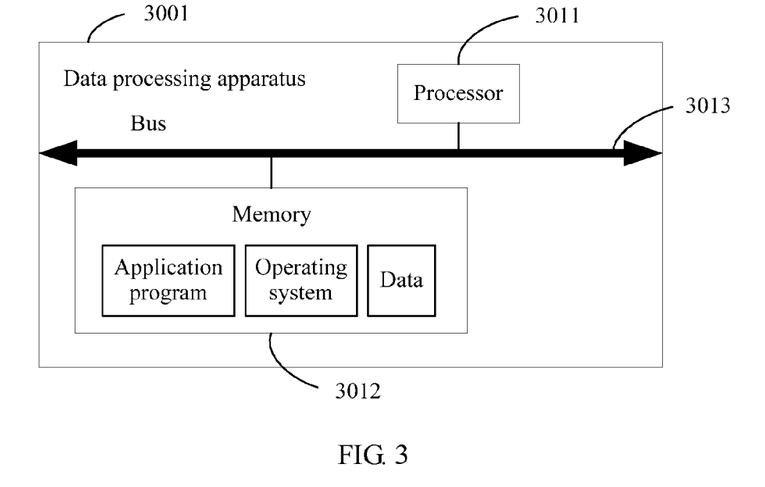
FIG. 3 is a schematic structural diagram of a data processing apparatus according to another embodiment of the present invention.

Another embodiment of the present invention provides a data processing apparatus 3001. Referring to FIG. 3, the device may be imbedded into or itself be a micro-processing computer, for example, a general purpose computer, a customized computer, or a portable device such as a mobile phone terminal or a tablet computer. The data processing apparatus 3001 includes at least one processor 3011, a memory 3012, and a bus 3013. The at least one processor 3011 and the memory 3012 are connected and implement mutual communication by using the bus 3013.

The bus 3013 may be an ISA (Industry Standard Architecture, Industry Standard Architecture) bus, a PCI (Peripheral Component, peripheral component interconnect) bus, an EISA (Extended Industry Standard Architecture, Extended Industry Standard Architecture) bus, or the like. The bus 3013 may be classified into an address bus, a data bus, a control bus, or the like. For ease of expression, only one bold line is shown in FIG. 3; however, it does not mean that there is only one bus or one type of bus.

The memory 3012 is configured to store application program code that executes the solution of the present invention, where the application program code that executes the solution of the present invention is stored in the memory and executed under control of the processor 3011.

The memory may be a read-only memory ROM or another type of static storage device that can store static information and an instruction, or a random access memory RAM or another type of dynamic storage device that can store information and an instruction, or may be an electrically erasable programmable read-only memory EEPROM, a compact disc read-only memory CD-ROM or other optical disk storage, optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or a data structure and can be accessed by a computer, but the present invention is not limited thereto. These memories are connected to the processor by using the bus.

The processor 3011 may be a central processing unit 3011 (Central Processing Unit, CPU for short) or an application-specific integrated circuit (Application Specific Integrated Circuit, ASIC for short), or is configured as one or more integrated circuits that implement the embodiment of the present invention.

The processor 3011 is configured to invoke program code in the memory 3012, and in a possible implementation manner, when the foregoing application program is executed by the processor 3011, implement the following functions:

The processor 3011 is configured to obtain a to-be-processed optical data packet, where the to-be-processed optical data packet includes an optical label and an optical signal data frame.

The processor 3011 is further configured to obtain the optical label from the to-be-processed optical data packet, and determine, according to the optical label, whether the optical signal data frame is a data frame of a preset type.

If the optical signal data frame is the data frame of the preset type, the optical label includes a label destination address, and the processor 3011 is further configured to obtain a port corresponding to the label destination address according to the label destination address, and use the port corresponding to the label destination address as a target port and generate an optical switching instruction, where the optical switching instruction includes the target port.

The processor 3011 is further configured to output the to-be-processed optical data packet through the target port according to the optical switching instruction.

According to the data processing apparatus provided in this embodiment of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

Optionally, if the optical signal data frame is not the data frame of the preset type, the processor 3011 is further configured to: generate an electrical switching instruction; convert, according to the electrical switching instruction, the optical signal data frame into a corresponding electrical signal data frame by means of optical-to-electrical conversion; obtain a switching address from the electrical signal data frame; and output, according to the switching address, the electrical signal data frame through a port corresponding to the switching address.

Further optionally, the processor 3011 is further configured to: parse the electrical signal data frame to obtain a Media Access Control MAC frame and output, according to the MAC frame, the electrical signal data frame through a port corresponding to the MAC frame.

Optionally, the processor 3011 is further configured to search whether the optical label includes a protocol frame identifier, where if the optical label includes the protocol stack identifier, the optical signal data frame is a protocol frame and the optical signal data frame is not the data frame of the preset type.

Optionally, the processor 3011 is further configured to determine, from stored port occupancy information, whether the port corresponding to the label destination address is available, where if the port corresponding to the label destination address is unavailable, the optical signal data frame is not the data frame of the preset type; and the port occupancy information includes an occupancy status of each port.

According to the data processing apparatus provided in this embodiment of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

Figure 4:
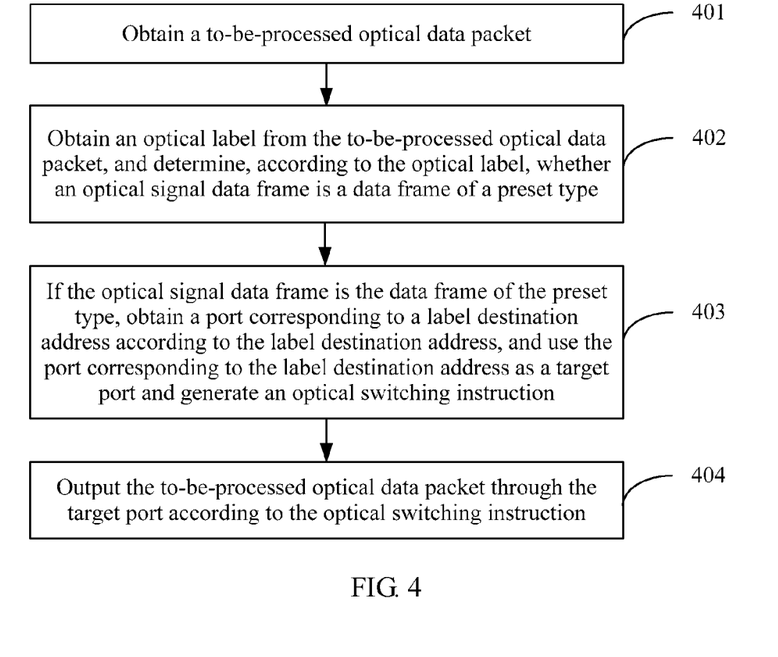
FIG. 4 is a schematic flowchart of a data processing method according to an embodiment of the present invention.

Based on the foregoing embodiment corresponding to FIG. 1, an embodiment of the present invention provides a data processing method, which is applied to the data processing apparatus described in the foregoing embodiment corresponding to FIG. 1. Referring to FIG. 4, the data processing method includes the following steps:

401. Obtain a to-be-processed optical data packet.

A data packet is a unit of data in information transmission. An optical data packet is a unit of data in optical fiber communication. In a switching network, a single message is split into multiple data blocks, which are referred to as data packets. A data packet includes address information of a transmit end and a receive end. The data packets are transmitted over different paths in a network, and recombined at the receive end. The to-be-processed optical data packet includes an optical label and an optical signal data frame. Specifically and optionally, the optical label includes information such as a label destination address, length information, and a data frame type.

402. Obtain an optical label from the to-be-processed optical data packet, and determine, according to the optical label, whether an optical signal data frame is a data frame of a preset type.

Specifically and optionally, it may be determined, according to the data frame type included in the optical label, whether the optical signal data frame is a data frame of a preset type. Optionally, the data frame type may be a protocol frame identifier. Optical switching may be performed for a data frame of a preset type because during optical switching, optical-to-electrical conversion and parsing do not need to be performed on an optical signal, and the optical signal may be directly and transparently transmitted, which can reduce a delay and energy consumption for data processing. Therefore, optical switching is used for an optical signal data frame for which optical switching can be performed.

403. If the optical signal data frame is the data frame of the preset type, obtain a port corresponding to the label destination address according to the label destination address, and use the port corresponding to the label destination address as a target port and generate an optical switching instruction.

The optical switching instruction includes the target port.

404. Output the to-be-processed optical data packet through the target port according to the optical switching instruction.

According to the data processing method provided in this embodiment of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

Figure 5:
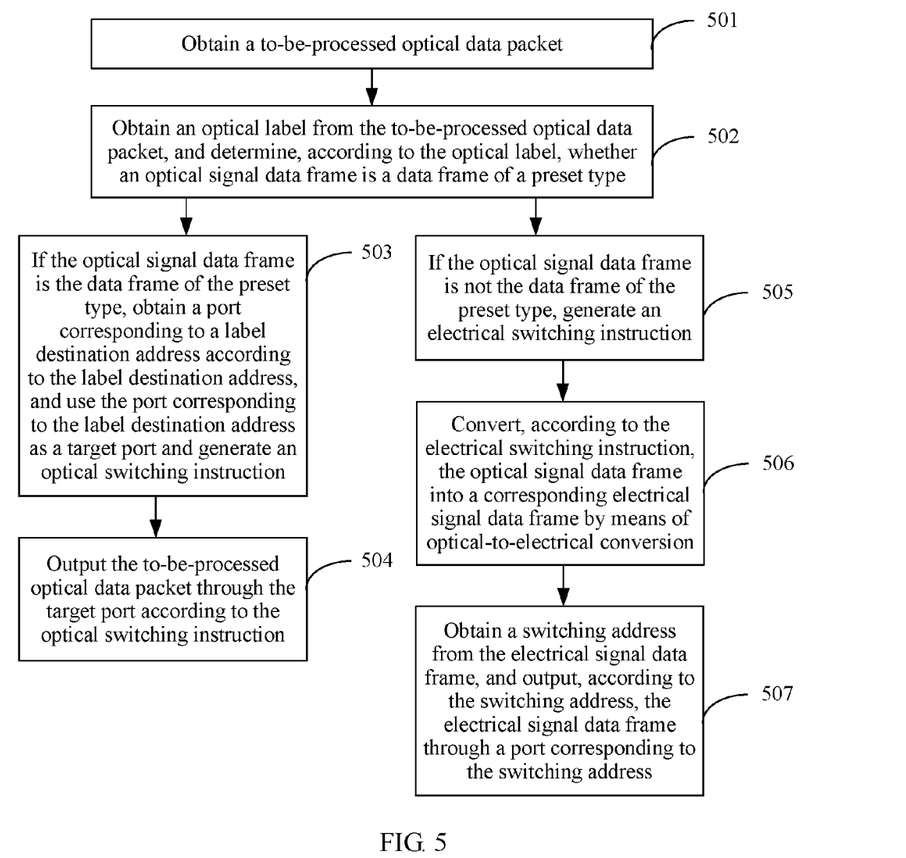
FIG. 5 is a schematic flowchart of a data processing method according to another embodiment of the present invention.

Based on the foregoing embodiment corresponding to FIG. 4, another embodiment of the present invention provides a data processing method. Referring to FIG. 5, the method includes the following steps:

501. Obtain a to-be-processed optical data packet.

The to-be-processed optical data packet includes an optical label and an optical signal data frame. Specifically and optionally, the optical label includes information such as a label destination address, length information, and a data frame type.

502. Obtain an optical label from the to-be-processed optical data packet, and determine, according to the optical label, whether an optical signal data frame is a data frame of a preset type.

Specifically and optionally, optical switching is performed for a data frame of a preset type, and electrical switching is performed for a data frame that is not of the preset type, because during optical switching, optical-to-electrical conversion and parsing do not need to be performed on an optical signal, and the optical signal may be directly and transparently transmitted, which can reduce a delay and energy consumption for data processing.

Optionally, this embodiment gives several types of data frames that are not of the preset type, that is, data frames for which electrical switching is performed.

A type of the optical signal data frame is determined according to the data frame type included in the optical label. Optionally, if the optical label includes a protocol frame identifier, the optical signal data frame is a protocol frame; if the optical label includes no label destination address, the optical signal data frame is a broadcast frame. When the optical signal data frame is a broadcast frame or a protocol frame, the optical signal data frame is not the data frame of the preset type. Specifically, because a protocol frame includes a feedback on a signal scheduling instruction and needs to be parsed, the protocol frame needs to be parsed by means of electrical switching and then is returned to a transmit end. A broadcast frame needs to be transmitted to all ports. It cannot be ensured that all ports are idle. A specific port may transmit another signal and data cannot be buffered during optical switching. Therefore, electrical switching needs to be performed for a broadcast frame. If a specific port is transmitting another signal, the signal is buffered, and is transmitted only after the port is idle.

It is determined, from stored port occupancy information, whether the port corresponding to the label destination address is available, where if the port corresponding to the label destination address is unavailable, the optical signal data frame is not the data frame of the preset type; and the port occupancy information includes an occupancy status of each port. This is a case for service frames that are in conflict. It may be determined, according to the port occupancy information, whether each port is occupied. If the port corresponding to the label destination address is being used or another to-be-processed optical data packet needs to use a same port, the optical signal data frames are service frames that are in conflict, and only electrical switching can be performed for the to-be-processed optical data packet.

Other service frames may be data frames of a preset type, for all of which optical switching can be performed. Certainly, a priority may be set for the preset type according to a specific situation. A specific solution for the preset type is not limited in the present invention.

503. If the optical signal data frame is the data frame of the preset type, obtain a port corresponding to the label destination address according to the label destination address, and use the port corresponding to the label destination address as a target port and generate an optical switching instruction.

Specifically, one label destination address corresponds to one port. Optionally, when a signal is input, a source address of the signal corresponds to an input port and a correspondence between the source address and the input port may be stored. When the source address is used as the label destination address, the input port may be used as the port corresponding to the label destination address for outputting data.

504. Output the to-be-processed optical data packet through the target port according to the optical switching instruction.

After the optical switching instruction is generated, the to-be-processed optical data packet is transmitted to an optical switching unit, and then is output from the target port by means of optical switching.

Optionally, the to-be-processed optical data packet is transmitted to the optical switching unit by using a 1×2 switch. In this case, the 1×2 switch respectively corresponds to the optical switching unit and an electrical switching unit. If there is another switching unit, a corresponding 1×N switch may be selected. In addition, after being output through the target port, the to-be-processed optical data packet may be output by using a 2×1 switch corresponding to the 1×2 switch. By using the 2×1 switch, the to-be-processed optical data packet is combined with a data packet that is output by the electrical switching unit. Because one signal has multiple data packets, data packets in a same signal need to be combined.

After step 502, the method further includes:

505. If the optical signal data frame is not the data frame of the preset type, generate an electrical switching instruction.

506. Convert, according to the electrical switching instruction, the optical signal data frame into a corresponding electrical signal data frame by means of optical-to-electrical conversion.

After the electrical switching instruction is generated, the optical signal data frame in the to-be-processed optical data packet is transmitted to the electrical switching unit and converted into an electrical signal data frame by means of optical-to-electrical conversion in the electrical switching unit.

507. Obtain a switching address from the electrical signal data frame, and output, according to the switching address, the electrical signal data frame through a port corresponding to the switching address.

Specifically, one switching address corresponds to one port.

Optionally, a MAC frame is obtained by parsing the electrical signal data frame, and a MAC address is extracted from the MAC frame, which is the switching address. Certainly, an Internet Protocol (IP, Internet Protocol) address may also be used as the switching address. A specific form of the switching address is not limited in the present invention.

In this way, the data processing apparatus performs optical switching on some optical signals and performs electrical switching on some optical signals, reducing a delay and energy consumption for data processing while ensuring that data exchange is properly performed.

According to the data processing method provided in this embodiment of the present invention, a to-be-processed optical data packet is obtained, an optical label is obtained from the to-be-processed optical data packet, and it is determined, according to the optical label, whether an optical signal data frame is a data frame of a preset type; if the optical signal data frame is the data frame of the preset type, a port corresponding to a label destination address is obtained according to an optical label destination address and an optical switching instruction is generated, and the to-be-processed optical data packet is output through a target port according to the optical switching instruction, which reduces a delay and energy consumption for data processing in a data exchange process of an optical network.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM (Random Access Memory, random access memory), a ROM (Read-Only Memory, read-only memory), an EEPROM (Electrically Erasable Programmable Read-Only Memory, electrically erasable programmable read-only memory), a CD-ROM (Compact Disc Read-Only Memory, compact disc read-only memory) or other optical disc storage, a disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a DSL (Digital Subscriber Line, digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a CD (Compact Disc, compact disc), a laser disc, an optical disc, a DVD (Digital Versatile Disc, digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing apparatus, comprising:
an obtaining unit, configured to obtain a to-be-processed optical data packet, wherein the to-be-processed optical data packet comprises an optical label and an optical signal data frame;
a control unit, configured to: obtain the optical label from the to-be-processed optical data packet obtained by the obtaining unit, and determine, according to the optical label, whether the optical signal data frame is a data frame of a preset type, wherein if the optical signal data frame is the data frame of the preset type, the optical label comprises a label destination address; and the control unit is further configured to: obtain a port corresponding to the label destination address according to the label destination address, and use the port corresponding to the label destination address as a target port and generate an optical switching instruction, wherein the optical switching instruction identifies the target port; and
an optical switching unit, configured to output the to-be-processed optical data packet through the target port according to the optical switching instruction generated by the control unit,
wherein if the optical signal data frame is not the data frame of the preset type, the control unit is further configured to generate an electrical switching instruction;
the data processing apparatus further comprises an electrical switching unit; wherein
the electrical switching unit is configured to: convert, according to the electrical switching instruction, the optical signal data frame into a corresponding electrical signal data frame by means of optical-to-electrical conversion; obtain a switching address from the electrical signal data frame; and output, according to the switching address, the electrical signal data frame through a port corresponding to the switching address.

2. The apparatus according to claim 1, wherein:
the electrical switching unit is further configured to: parse the electrical signal data frame to obtain a Media Access Control (MAC) frame; and output, according to the MAC frame, the electrical signal data frame through a port corresponding to the MAC frame.

3. The apparatus according to claim 1, wherein:
the control unit is further configured to search whether the optical label comprises a protocol frame identifier, wherein if the optical label comprises the protocol frame identifier, the optical signal data frame is a protocol frame and the optical signal data frame is not the data frame of the preset type.

4. The apparatus according to claim 1, wherein:
the control unit is further configured to determine, from stored port occupancy information, whether the port corresponding to the label destination address is available, wherein if the port corresponding to the label destination address is unavailable, the optical signal data frame is not the data frame of the preset type; and the port occupancy information comprises an occupancy status of each port.

5. A data processing apparatus, comprising: a processor, a memory, and a bus, wherein the processor and the memory are connected to each other by the bus;
the processor is configured to obtain a to-be-processed optical data packet, wherein the to-be-processed optical data packet comprises an optical label and an optical signal data frame;
the processor is further configured to obtain the optical label from the to-be-processed optical data packet, and determine, according to the optical label, whether the optical signal data frame is a data frame of a preset type;
if the optical signal data frame is the data frame of the preset type, the optical label comprises a label destination address; the processor is further configured to: obtain a port corresponding to the label destination address according to the label destination address, and use the port corresponding to the label destination address as a target port and generate an optical switching instruction, wherein the optical switching instruction identifies the target port; and
the processor is further configured to output the to-be-processed optical data packet through the target port according to the optical switching instruction,
wherein if the optical signal data frame is not the data frame of the preset type, the processor is further configured to: generate an electrical switching instruction; convert, according to the electrical switching instruction, the optical signal data frame into a corresponding electrical signal data frame by means of optical-to-electrical conversion; obtain a switching address from the electrical signal data frame; and output, according to the switching address, the electrical signal data frame through a port corresponding to the switching address.

6. The apparatus according to claim 5, wherein:
the processor is further configured to: parse the electrical signal data frame to obtain a Media Access Control (MAC) frame; and output, according to the MAC frame, the electrical signal data frame through a port corresponding to the MAC frame.

7. The apparatus according to claim 5, wherein:
the processor is further configured to search whether the optical label comprises a protocol frame identifier, wherein if the optical label comprises the protocol frame identifier, the optical signal data frame is a protocol frame and the optical signal data frame is not the data frame of the preset type.

8. The apparatus according to claim 5, wherein:
the processor is further configured to determine, from stored port occupancy information, whether the port corresponding to the label destination address is available, wherein if the port corresponding to the label destination address is unavailable, the optical signal data frame is not the data frame of the preset type; and the port occupancy information comprises an occupancy status of each port.

9. A data processing method, comprising:
obtaining a to-be-processed optical data packet, wherein the to-be-processed optical data packet comprises an optical label and an optical signal data frame;
obtaining the optical label from the to-be-processed optical data packet, and determining, according to the optical label, whether the optical signal data frame is a data frame of a preset type, wherein if the optical signal data frame is the data frame of the preset type, the optical label comprises a label destination address;
obtaining a port corresponding to the label destination address according to the label destination address, and using the port corresponding to the label destination address as a target port and generating an optical switching instruction, wherein the optical switching instruction identifies the target port; and
outputting the to-be-processed optical data packet through the target port according to the optical switching instruction;
if the optical signal data frame is not the data frame of the preset type, generating an electrical switching instruction;
converting, according to the electrical switching instruction, the optical signal data frame into a corresponding electrical signal data frame by means of optical-to-electrical conversion; and
obtaining a switching address from the electrical signal data frame, and outputting, according to the switching address, the electrical signal data frame through a port corresponding to the switching address.

10. The method according to claim 9, wherein the obtaining a switching address from the electrical signal data frame, and outputting, according to the switching address, the electrical signal data frame through a port corresponding to the switching address comprises:
parsing the electrical signal data frame to obtain a Media Access Control (MAC) frame; and
outputting, according to the MAC frame, the electrical signal data frame through a port corresponding to the MAC frame.

11. The method according to claim 9, wherein the determining, according to the optical label, whether the optical signal data frame is a data frame of a preset type comprises:
searching whether the optical label comprises a protocol frame identifier, wherein if the optical label comprises the protocol frame identifier, the optical signal data frame is a protocol frame and the optical signal data frame is not the data frame of the preset type.

12. The method according to claim 9, wherein the determining, according to the optical label, whether the optical signal data frame is a data frame of a preset type comprises:
determining, from stored port occupancy information, whether the port corresponding to the label destination address is available, wherein if the port corresponding to the label destination address is unavailable, the optical signal data frame is not the data frame of the preset type; and the port occupancy information comprises an occupancy status of each port.

* * * * *